Figure 1:
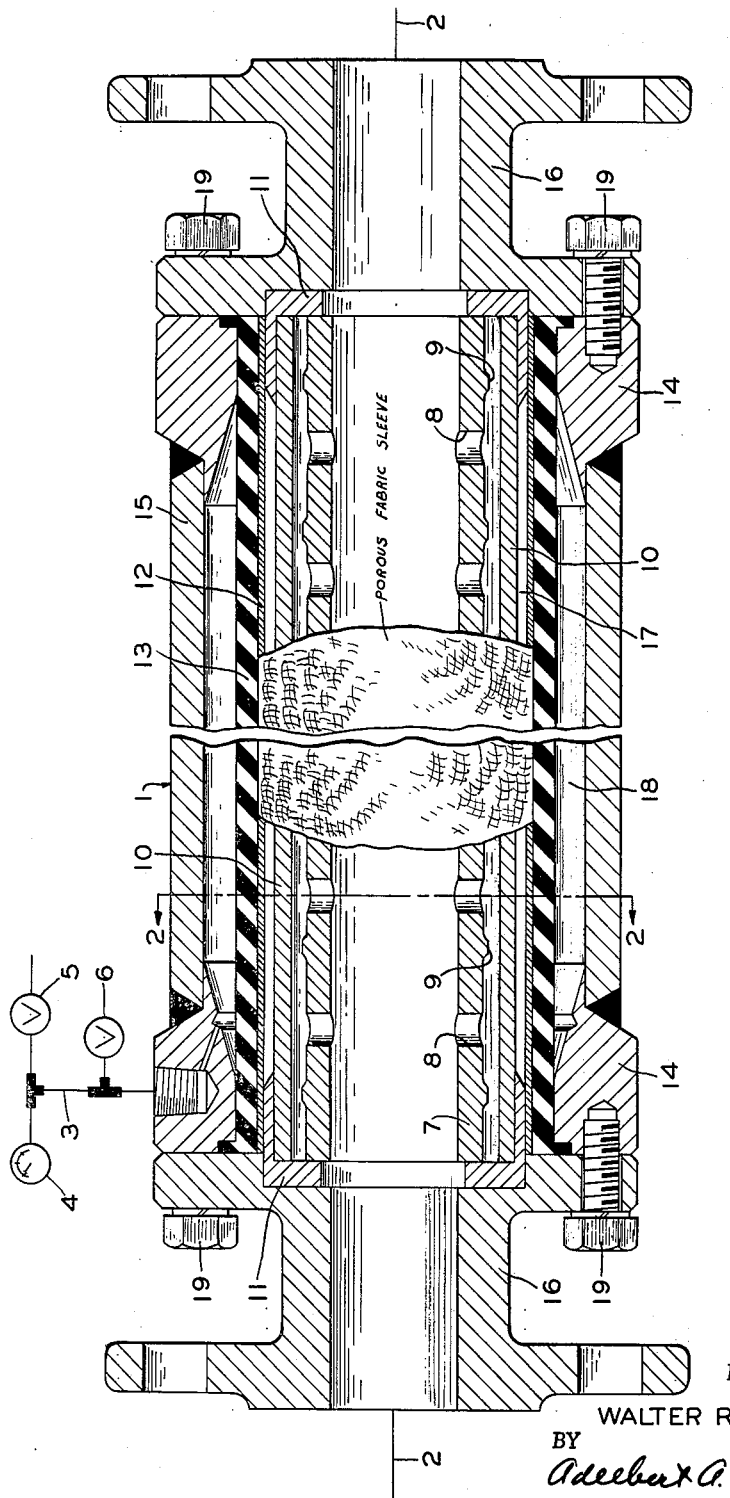

Nov. 13, 1962  W. R. FORSTER  3,063,470
PULSATION DAMPENER DEVICE
Filed Feb. 25, 1959  2 Sheets-Sheet 1

INVENTOR.
WALTER R. FORSTER
BY
Adelbert A. Steinmiller
ATTORNEY

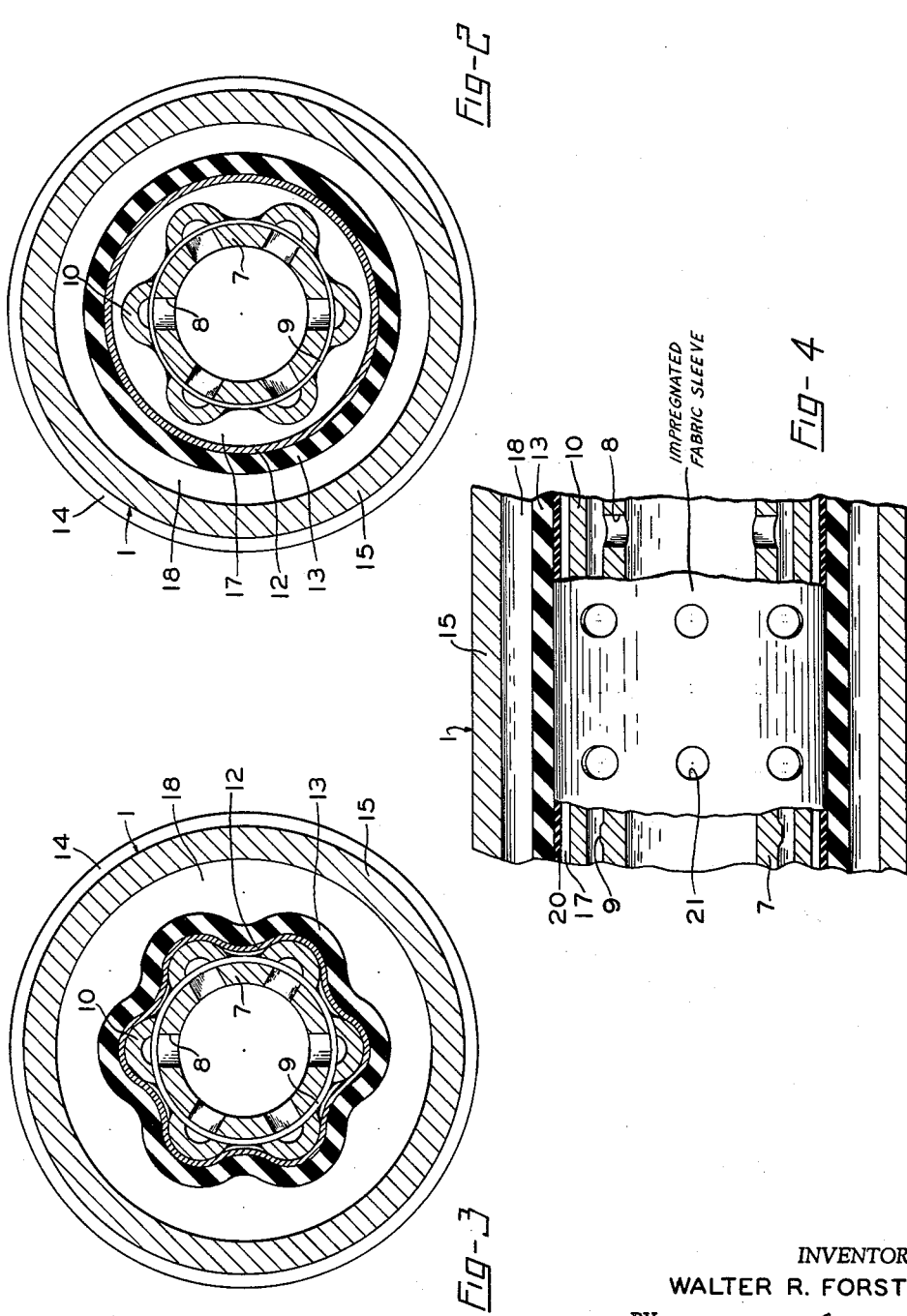

3,063,470
PULSATION DAMPENER DEVICE
Walter R. Forster, Pittsburgh, Pa., assignor to Westinghouse Air Brake Company, Wilmerding, Pa., a corporation of Pennsylvania
Filed Feb. 25, 1959, Ser. No. 795,482
2 Claims. (Cl. 138—30)

This invention relates to pulsation dampener devices of the type comprising resilient sleeve means concentrically surrounding a tubular mandrel to form therebetween an expansible pressure absorbing chamber which is open through orifices in the mandrel to a fluid conveying line or conduit, and more particularly relates to a novel pulsation dampener device of the above type embodying protective means for preventing extrusion of the resilient sleeve into the orifices in the mandrel.

It is well known that, in the operation of pulsation dampening devices of the above conventional type, the pre-charge pressure acting on the outside of the resilient sleeve means is effective upon sudden decreases of line fluid pressure in the mandrel to cause the resilient sleeve to be pressed against the outer surface of the mandrel and, in the course of time, become extruded into the orifices in the mandrel, thus causing destructive cutting and abrading of the sleeve, and correspondingly limiting the service life of the sleeve.

Various solutions to this problem intended to lengthen the service life of the expansible rubber sleeve have been proposed such as providing a plurality of longitudinal rows of orifices in the mandrel and securing semicylindrical rods over the rows of orifices in a manner permitting free flow of fluid in either direction through the orifices, the rods preventing the extrusion of the rubber sleeve into the orifices.

However, even in the use of the above type of arrangement comprising rods over the orifices in the mandrel, it has been found that the service life of the resilient sleeve is shortened as a result of the resilient sleeve being cut and abraded upon extrusion of the sleeve into elongated openings or slots formed in the rods and which serve to permit fluid to flow from the inside of the mandrel to the outside of the mandrel, or in the reverse direction, via the orifices in the mandrel.

It is the purpose of this invention to provide protective sleeve means to prevent extrusion of the resilient sleeve into the openings or slots formed in the rods on the mandrel, in the above-described type of pulsation dampener device.

According to this invention, a novel pulsation dampener device of the hereinbefore-mentioned type is provided comprising a mandrel having a tubular portion with orifices therethrough and longitudinal rods in radially spaced relation over the orifices to provide openings between the rods and the tubular portion of the mandrel, and a flexible porous protective sleeve interposed between the mandrel and the conventional resilient sleeve for preventing extrusion of the resilient sleeve into the openings between the rods and the tubular portion of the mandrel upon fluctuations of the pressure of fluid in the conduit.

In the accompanying drawing, FIG. 1 is a broken longitudinal sectional view showing the novel pulsation dampener device utilizing one embodiment of a protective sleeve made of porous fabric; FIG. 2 is a cross-sectional view of the pulsation dampener device taken along the line 2—2 of FIG. 1 showing the relative positions and configurations of the fabric sleeve and the resilient sleeve without line pressure or pre-charging pressure in the pulsation dampener device; FIG. 3 is also a cross-sectional view taken on the line 2—2 of FIG. 1 showing the theoretical relative positions and configurations of the fabric sleeve and the resilient sleeve at an instant when the line fluid pressure in the mandrel is decreased below that of the pre-charge pressure on the outside of the resilient sleeve; and FIG. 4 is a partial longitudinal sectional view of the pulsation dampener showing the use of another embodiment of a protective sleeve made of fabric impregnated with rubber and having slots therein to provide porosity.

Description

Referring to FIG. 1 of the drawing, a pulsation dampener device 1 embodying the invention is shown interposed in a conduit 2 conveying a fluid under pressure and connected to a source of compressible gas under pressure, such as air, via a supply pipe 3 provided with a pressure gauge 4, a supply valve 5 and a release valve 6.

Device 1 comprises a mandrel having a tubular portion 7 in which are a plurality of longitudinally aligned rows of circumferentially spaced throttling orifices 8 therethrough and on the outer surface of which are formed annular ribs or lands 9, one between each adjacent pair of circumferential series of orifices 8. Also forming part of the mandrel are longitudinally extending rods 10 which are positioned over each longitudinal row of orifices 8 and which are secured to the lands 9, preferably by welding. Elongated openings or slots are thus formed on each side of rods 10 between rods 10 and tubular portion 7, to permit fluid flowing through the orifices to escape to or return from the outside of the mandrel. The total flow capacity of the openings or slots is at least equal to but preferably greater than the total flow capacity of the orifices 8. Rods 10 are illustratively shown as semi-circular pipe sections but they may be solid if desired.

A cup-shaped collar member 11 is coaxially disposed over each end of the mandrel, the central opening of the collar member 11 being as large as the inside diameter of the tubular portion 7 of the mandrel.

A protective sleeve member 12 closely surrounds the mandrel and is preferably made of a flexible porous fabric material. As will become apparent from later description, the opposite ends of sleeve member 12 are clamped around the outside cylindrical surface of the collar members 11 so as to maintain a taut longitudinal condition. As shown in FIG. 2, sleeve 12 thus assumes a circular configuration under nonpressure conditions.

A resilient sleeve 13, of rubber or suitable rubber composition and having flanges at opposite ends, concentrically surrounds protective sleeve member 12 and the mandrel and is sealingly and securely clamped adjacent its respective flanged ends between collar members 11 annular end rings 14 of a cylindrical casing member 15 concentrically surrounding sleeve 13, and the inner faces of annular casing end caps 16. There is thus formed at the inner side of sleeve 13 a fluid pressure absorbing chamber 17 open to the inside of tubular portion 7 via orifices 8 and at the outer side of sleeve 13 an annular pressure chamber 18. Chamber 18 may be pressurized with a gas, such as air, from a source of pressure supply via pipe 3, that is connected to a port and passage in one of the end rings 14 which opens into chamber 18.

End caps 16, coaxial mandrel 7, are secured as by screws 19 to the respective outer faces of end rings 14. Sections of conduit 2 are connected to the end caps 16 by suitable flange fittings (not shown) bolted to the end caps.

In operation, assume that chamber 18 is pressurized with air at a selected pressure, substantially equal to the fluid pressure in the conduit 2, via supply pipe 3 and that, at the same time, fluid under pressure flows through conduit 2 and tubular portion 7 of the mandrel. The fluid under pressure in tubular portion 7 flows to chamber 17 through orifices 8, the slots between rods 10 and tubular portion 7, and through the porous sleeve 12 to act upon the inner surface of resilient sleeve 13 against the substantially equal force of air pressure in chamber 18 acting on the outer surface of sleeve 13.

Upon a sudden surge of pressure of fluid in conduit 2, such as is characteristic of conduits connected to reciprocating, centrifugal, or rotary pumps, fluid under pressure will flow to fluid pressure absorbing chamber 17 through the orifices 8, through the slots between annular lands 9, and through fabric sleeve 12, to act upon the inner surface of the resilient sleeve 13 to thereby force the resilient sleeve 13 outwardly against the force of air pressure in the pre-charged chamber 18. While the resilient sleeve 13 will be expanded radially by the pressure of fluid during the surge, fabric sleeve 12 will maintain a substantially cylindrical configuration (as shown in FIG. 2) about the mandrel by reason of the fact that sleeve 12 is subject to equalized fluid pressures on the inside and outside surfaces thereof. Moreover, the total area of the pores or openings in the fabric sleeve 12 is greater than the total area of the elongated openings or slots in the mandrel in order to prevent the pores or openings in the fabric sleeve 12 from restricting the flow of fluid to a greater degree than the degree of restriction of orifices 8 and thus from performing the throttling function of the orifices 8.

However, if there is a sudden decrease of pressure of fluid in conduit 2, the preponderant force of air pressure in the pre-charged chamber 18 will force resilient sleeve 13 inwardly toward the mandrel into the longitudinal valleys formed between the crests of the rods 10, thus causing fabric sleeve 12 to flex correspondingly inwardly into engagement with the outer surface of rods 10 and tubular portion 7, as shown in FIG. 3. As a consequence of the relatively non-stretchable quality of the sleeve 12 and since the outer contour of the mandrel and the inner circumference of sleeve 12 are substantially the same in length, sleeve 12 will not be extruded into the orifices 8 of tubular portion 7 and will thus prevent resilient sleeve 13 from being extruded into the slots between rods 10 and tubular portion 7.

In FIG. 4 there is illustrated a modified embodiment of a protective sleeve 20 made of a flexible fabric material impregnated with a suitable rubber or resin compound and provided with a plurality of holes or slots 21 to provide the necessary porosity. The total area of the holes or slots 21 is greater than the total area of the elongated openings or slots in the mandrel, as is characteriistic of fabric sleeve 12. It will be apparent, therefore, that sleeve 20 functions in a manner similar to the previously described embodiment and further description of the operation of this embodiment is thus deemed unnecessary.

Having now described the invention, what I claim as new and desire to secure by Letters Patent, is:

1. A pulsation dampener device comprising, in combination, a tubular mandrel connectable to a fluid conveying conduit in which the fluid is subject to pressure surges, resilient sleeve means concentrically surrounding said tubular mandrel in spaced relation and sealed at opposite ends thereof so as to define an expansible chamber therebetween, said mandrel having orifices therein through which the pressure of fluid in said mandrel is communicated to act on the interior of said sleeve means to expand said sleeve means upon surges of pressure in said mandrel and conduit, hollow rods extending longitudinally of said mandrel and over said orifices in said mandrel and providing longitudinally extending openings between said rods and said mandrel via which the pressure of fluid in said mandrel and conduit is communicated to said expensible chamber from said hollow rods, casing means concentrically surrounding said sleeve means so as to provide an annular chamber surrounding said sleeve means, into which annular chamber a compressible gas under pressure may be introduced to oppose expansion of said sleeve means due to pressure surges in said conduit and mandrel, and a protective sleeve of open-mesh fabric material tautly stretched in concentric close-fitting relation to said resilient sleeve means between said resilient sleeve means and said mandrel and having an inside circumference no greater than the outside perimeter of the mandrel and the rods, said fabric material being impregnated with a resilient material sealing the open-mesh in said fabric, said protective sleeve having holes therethrough for equalization of fluid pressure on opposite sides of said protective sleeve, which holes have a total fluid flow capacity greater than the total fluid flow capacity of said orifices in said mandrel, said protective sleeve collapsing with said resilient sleeve means on occurrence of pressure rarefactions in said mandrel and conduit and serving to prevent extrusion of said resilient sleeve means into said longitudinal openings provided by said hollow rods.

2. A pulsation dampener device comprising, in combination, a tubular mandrel connectable to a fluid conveying conduit in which the fluid is subject to pressure surges, resilient sleeve means concentrically surrounding said tubular mandrel in spaced relation and sealed at opposite ends thereof so as to define an expansible chamber therebetween, said mandrel having orifices therein through which the pressure of fluid in said mandrel is communicated to act on the interior of said sleeve means to expand said sleeve means upon surges of pressure in said mandrel and conduit, hollow rods extending longitudinally of said mandrel and over said orifices in said mandrel and providing longitudinally extending openings between said rods and said mandrel via which the pressure of fluid in said mandrel and conduit is communicated to said expansible chamber from said hollow rods, casing means concentrically surrounding said sleeve means so as to provide an annular chamber surrounding said sleeve means, into which annular chamber a compressible gas under pressure may be introduced to oppose expansion of said sleeve means due to pressure surges in said conduit and mandrel, and a protective sleeve made of open-mesh flexible fabric material tautly stretched in concentric close-fitting relation between said resilient sleeve means and said mandrel and impregnated with a resilient material sealing the open-mesh in said fabric, said protective sleeve having holes therethough for equalization of fluid pressure on opposite sides of said protective sleeve, which holes have a total fluid flow capacity greater than the total fluid flow capacity of said orifices in said mandrel, said protective sleeve collapsing with said resilience sleeve means on occurrence of pressure rarefactions in said mandrel and conduit and serving to prevent extrusion of said resilient sleeve means into said longitudinal openings provided by said hollow rods.

References Cited in the file of this patent

UNITED STATES PATENTS

| | | |
|---|---|---|
| 2,283,439 | Herman | May 19, 1942 |
| 2,345,475 | Herman et al. | Mar. 28, 1944 |
| 2,378,467 | De Kiss | June 19, 1945 |
| 2,841,181 | Hewitt et al. | July 1, 1958 |
| 2,845,951 | Hugley et al. | Aug. 5, 1958 |
| 2,875,788 | Pier | Mar. 3, 1959 |